July 1, 1930.  A. W. HULL  1,769,837
ELECTROLYTIC RECTIFIER
Filed Feb. 26, 1926

Inventor:
Albert W. Hull,
by *His Attorney*.

Patented July 1, 1930

1,769,837

UNITED STATES PATENT OFFICE

ALBERT W. HULL, OF SCHENECTADY, NEW YORK, ASSIGNOR TO GENERAL ELECTRIC COMPANY, A CORPORATION OF NEW YORK

ELECTROLYTIC RECTIFIER

Application filed February 26, 1926. Serial No. 90,951.

My invention relates to electrical apparatus, and more particularly to electrolytic rectifiers and similar devices which comprise liquid immersed electrodes.

Small rectifiers at the present time are used to considerable extent in connection with radio apparatus and, as such apparatus is used in the home, the rectifier should not give off fumes or be constructed so as to permit the spilling of electrolyte. Furthermore, in radio systems it is usual to connect filter units in the output circuit of the rectifier in such a manner that a substantially constant current may be supplied from the rectifier to the consumption circuit. Such units usually comprise capacity elements and co-operating resistance or inductance elements. It is known that large capacities, such as are required, can be obtained by the use of electrolytic condensers, containing liquid electrolyte, and I take advantage of this fact by incorporating these condensers in the rectifier unit itself.

In accordance with my invention, I have provided an air tight electrolytic cell in which one of the electrodes comprises one of the plates of a condenser which may be employed in a filter unit associated with the output circuit of the cell. In accordance with another feature of my invention, I have provided means for maintaining a low normal gas pressure in a cell of the above type.

Figure 1:
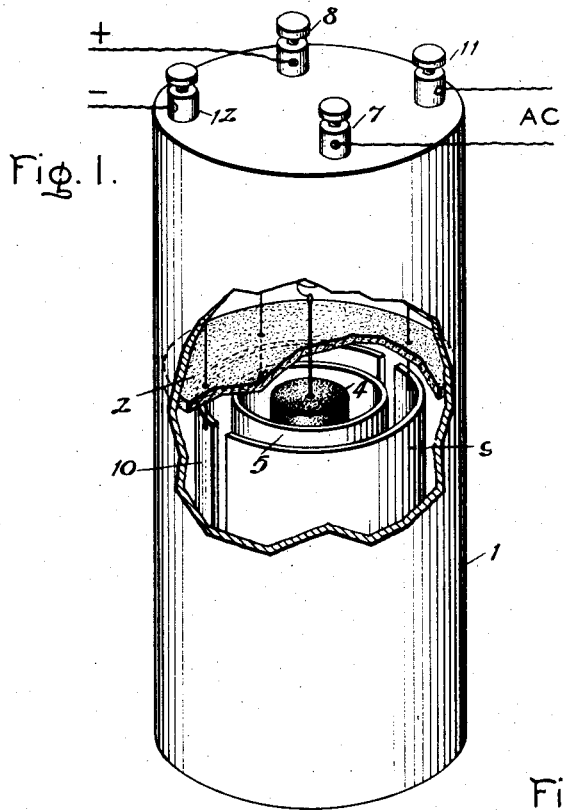
Figures 2, 3:
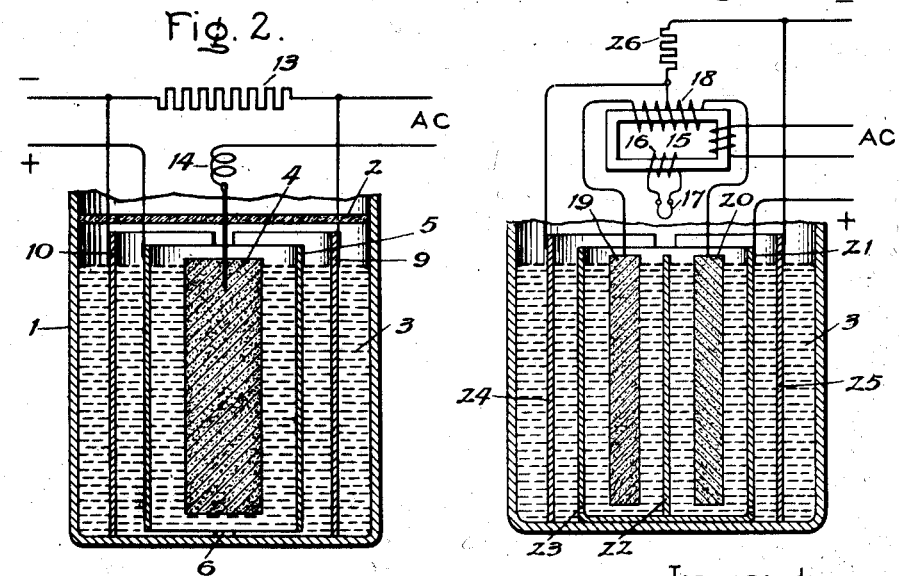

The novel features which I believe to be characteristic of my invention are set forth with particularity in the appended claims. My invention itself, however, both as to its organization and method of operation, will best be understood by reference to the following specification taken in connection with the accompanying drawing, in which Fig. 1 is a perspective view, partly broken away, of a half wave rectifier and a two-stage filter; Fig. 2 is a cross section of the lower portion of the cell shown in Fig. 1; and Fig. 3 is a cross section of the lower portion of a full wave rectifier and two-stage filter.

Referring to the drawing, I have indicated at 1 a sealed air-tight container which may be constructed of any suitable material, such as glass, and enclosed in an air-tight sealing wax or pitch case in a manner similar to the ordinary dry cell. The container is divided into two compartments by means of a partition 2, which may be made either of porous material such as unglazed porcelain or of glass. If made of the latter material, the partition should fit somewhat loosely within the container in order to allow for the passage of gas from one compartment to the other. The lower compartment is partly filled with an electrolyte 3 which may be either acid or alkaline, as desired. Mounted in the electrolyte are a cylindrical anode 4 and a surrounding hollow cylindrical electrode 5 which may be made of tantalum. In order to permit circulation of the electrolyte 2, the cylindrical electrode 5 may be supported slightly out of contact with the container 1 by means of insulating blocks 6. Electrodes 4 and 5 are connected to terminals or binding posts 7 and 8 respectively, which are mounted on the upper end of the container 1.

A pair of semicylindrical tantalum plates 9 and 10 surround the hollow electrode 5 and are connected to the terminals 11 and 12, between which a resistance or inductance unit 13 may be connected, the latter unit being mounted either on the inside or outside of the cell as desired. As thus constructed, the inner surface of electrode 5 acts as the cathode of the rectifier, while the outer surface thereof cooperates with plates 9 and 10 to form a pair of condenser units. In operation, alternating current is supplied to the cell at terminals 7 and 11, and a substantially constant current, due to the pressure of the filters which include the condenser units and resistance 13, is delivered at terminals 8 and 12.

During operation of the cell a large amount of hydrogen and oxygen gas is liberated at the electrodes and passes into the upper compartment of the cell. In order to prevent excessive pressure within the cell, provision must be made for the disposal of the gases. Ordinarily, openings are made in the upper part of the cell so that the gases thus evolved may escape into the atmosphere and thus maintain a normal low pressure within the cell. The presence of such openings is undesirable, however, since they permit leakage and evaporation of the electrolyte. In the present instance the electrolytic cell is sealed air-tight and excessive gas pressure is prevented by means of a catalyzing wire 14 which is mounted in the upper compartment of the cell and connected between the carbon anode 4 and the terminal 7. The alternating current supplied to the cell heats wire 14 to a dull incandescence which will be sufficient to cause combination of the hydrogen and oxygen and thereby prevent excessive pressure within the container. If desired, the wire may be coated with some especially sensitive catalyzer, such as palladium or platinum black, to increase its efficiency. The partition 2 protects the wire 14 from splashing of the electrolyte. Since wire 14 is connected to the alternating current source it will always be heated when the rectifier is in operation.

I have indicated in Fig. 3 a modification of my invention in which both portions of the alternating current wave are rectified. In the arrangement shown in this figure, alternating current is supplied to a transformer 15, which may be mounted in the upper compartment of the cell. A secondary winding 16 energizes a catalyzing wire 17, while another secondary winding 18 supplies current to a pair of carbon anodes 19 and 20 mounted within a hollow, cylindrical, tantalum cathode 21. The cathode 21 is provided with a partition 22 which separates the carbon anodes, and with a plurality of very small openings 23 in the base thereof to allow for circulation of the electrolyte. A plurality of tantalum condenser plates 24 and 25 cooperate with the cathode 21 to form a pair of capacity units. A resistance or inductance element 26 cooperates with the condenser units to form a two-stage filter and thus provide a substantially constant rectified current in the output circuit of the cell. The operation of the device shown in Fig. 3 is substantially identical with that shown in Fig. 1. By the employment of both half waves of the alternating current source, the rectified current is maintained more nearly constant than will be the case with the half wave rectifier shown in Figs. 1 and 2.

Various modifications of my invention will readily suggest themselves to persons skilled in the art without departing from the scope of my invention as set forth in the appended claims.

What I claim as new and desire to secure by Letters Patent of the United States is:

1. An electrolytic cell comprising a vessel containing an electrolyte, a hollow electrode mounted in the electrolyte, a second electrode within the first mentioned electrode and a pair of metallic plates cooperating with the outer surface of said hollow electrode to form condensers.

2. An electrolytic cell comprising a vessel containing an electrolyte, a hollow cylindrical cathode mounted in the electrolyte, a pair of anodes mounted in the hollow cathode, and a pair of metallic plates cooperating with said hollow cathode to provide condensers.

3. In combination, a rectifier unit comprising an air-tight receptacle containing an electrolyte, a pair of electrodes mounted in said electrolyte, a metallic plate cooperating with one of said electrodes to form a condenser and thereby maintain a substantially continuous flow of rectified current, and means mounted in said receptacle for maintaining the gas pressure therein substantially constant when alternating current is supplied to the rectifier unit.

4. In combination, a rectifier unit comprising an air-tight receptacle containing an electrolyte, a pair of electrodes mounted in said electrolyte, an electrical filter unit mounted in the receptacle and adapted to maintain a constant current output from the unit, and means for maintaining the gas pressure in the receptacle substantially constant when alternating current is supplied to the rectifier unit.

5. In combination, a rectifier unit comprising an air-tight container, an electrolyte therein, a pair of electrodes mounted in the electrolyte, means whereby alternating current may be supplied to said rectifier unit, and means responsive to said alternating current for maintaining the gas pressure in said cell substantially constant.

6. In combination, a rectifier unit comprising a container, an electrolyte therein, a pair of electrodes mounted in the electrolyte, means whereby an alternating current may be supplied to said rectifier unit, and means responsive to said alternating current for causing continuous chemical combination of the gaseous products of electrolysis in the unit.

In witness whereof, I have hereunto set my hand this 25th day of February, 1926.

ALBERT W. HULL.